United States Patent Office 3,320,088
Patented May 16, 1967

3,320,088
STEREOREGULAR POLYPROPYLENE COATED WITH AN INSOLUBILIZED ETHYLENE OXIDE POLYMER
George B. Feild, New Castle, Del., assignor to Hercules Incorporated, a corporation of Delaware
No Drawing. Filed Oct. 4, 1963, Ser. No. 313,809
6 Claims. (Cl. 117—138.8)

This invention relates to polypropylene articles such as fibers, filaments, films, etc., having insolubilized on the surface thereof a poly(ethylene oxide) coating and to the process of obtaining an adherent coating of poly(ethylene oxide) on said polypropylene articles.

At low humidities, many synthetic fibers develop static charge readily when rubbed with a second material differing in electronegativity. The discomfort of an electrical discharge resulting from the development of static charge by walking over carpets made with synthetic fibers is well known. Development of static charge on clothing contributes to undesirable clinging. Plastic film is often difficult to handle, particularly at low humidities, because of static charge effects. Plastics and films that develop static charges collect soil readily because of the electrostatic attraction for colloidal dirt particles in the air.

It is well known that poly(ethylene oxide) is an effective antistatic and sizing agent for natural and synthetic fibers. However, the effect is not permanent and, in fact, is only temporary since the poly(ethylene oxide) is removed by washing and/or dry-cleaning or is removed by normal abrasion during use. Articles made of polypropylene, as for example, fibers, filaments, fabrics, films, etc., are, like other synthetic materials, subject to static electricity and here the problem becomes even more acute due to the very easy removal of such a poly(ethylene oxide) coating on washing, dry-cleaning or abrasion.

Now in accordance with this invention, it has been discovered that an adherent and relatively permanent coating of an ethylene oxide polymer can be applied to the surface of a polypropylene article by applying to the surface a mixture of the ethylene oxide polymer and an azido cross-linking agent and heating or irradiating to effect cross-linking of the ethylene oxide polymer coating. The coating or modified surface so obtained is retained even after repeated washing and/or dry-cleaning, etc.

It has recently been discovered that polypropylene can be cross-linked by treatment with azido cross-linking agents but it was not surprising to find that an ethylene oxide polymer could be bound to the surface of a polypropylene article by means of an azido cross-linking agent. It is believed that the highly adherent coating is produced due to two mechanisms, cross-linking of the ethylene oxide polymer and cross-linking of the ethylene oxide polymer chains to the polypropylene polymer chains in the surface of the substrate.

Any azido cross-linking agent can be used in obtaining the adherent coating onto the polypropylene. An outstanding class of azido cross-linking agents that can be used are azidoformates which have the general formula

where $x$ is at least 1, preferably from about 1 to about 100, and R is an organic radical, inert to cross-linking reactions, containing at least one carbon atom per azidoformate group. Exemplary of these azidoformates are the alkyl azidoformates such as n-octadecyl azidoformate, tetramethylene - bis(azidoformate), pentamethylene-bis (azidoformate); the cyclic alkyl azidoformates such as 2-(1-p-methyl-8-yloxy) ethyl azidoformate; the aromatic azidoformates such as phenyl azidoformate, $\alpha,\alpha'$-p-xylylene - bis(azidoformate), 2,2 - isopropylidene - bis(p,p'-phenyl azidoformate); the azidoformate ethers such as 2,2' - oxydiethyl - bis(azidoformate), 2,2' - oxydipropyl-bis(azidoformate), 2,2' - ethylenedioxydiethyl - bis(azidoformate), the tetraazidoformate of pentaerythritol-propylene oxide adduct, the azidoformate thioethers such as 2,2'-thiodiethyl-bis(azidoformate), 4,4'-thiodibutyl-bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6-triazidobenzene, 4,4'-diphenyl diazide, 4,4'-diphenylmethane diazide, 4,4'-diazido diphenylamine, 4,4'-diazido diphenylsulfone, 2,7-diazidonaphthalene and 2,6-diazidoanthraquinone. Thus, any compound having at least one azido group in the molecule and preferably two or more can be used as the azido cross-linking agent in this invention.

The amount of the azido cross-linking agent used in the preparation of the adherent coatings of this invention can be varied over a wide range. Generally, it will be an amount of from about 0.1% of the weight of the ethylene oxide polymer up to as high as 20%, but usually will be from about 3 to 15% of the weight of the ethylene oxide polymer.

The cross-linking reaction can be initiated either thermally or by radiation. Thus, the reaction can be initiated by heating the coated polypropylene article to a temperature of from about 70° C. up to the melting point of the polypropylene, preferably to a temperature of from about 70° C. to about 160° C. and more preferably from about 100° C. to about 150° C. When the reaction is initiated by radiation, exposure to a wave length of from about 0.01 A. to about 7600 A. and preferably from about 2000 A. to about 5800 A. is effective. The time required to effect the cross-linking reaction will depend on the cross-linking agent, type of initiation used, temperature, etc. Generally for radiation initiation, an exposure period of from about 1 to 30 minutes is used, but much longer exposures can be used if desired.

Because some bis(azidoformate) cross-linking agents have an appreciable vapor pressure under the conditions used for thermal initiation, efficiency can be increased by confining the polypropylene article to reduce loss of the cross-linking agent by vaporization from the surface. A molding press operated at low pressures is very convenient for reducing the volatile loss. For a continuous process, the fabric or film being treated can be held between the surfaces of continuous belts of metal, rubber or plastic. Other similar methods for reducing volatile loss will be apparent. Use of azidoformate cross-linking agents with lower vapor pressure avoids the need for confining the article to reduce volatile loss.

Any article made of a stereoregular polypropylene, i.e., crystalline polypropylene sometimes also called isotactic, can be coated by the process of this invention.

The ethylene oxide polymers used to form the adherent coating on the surface of polypropylene articles in accordance with this invention can be either a homopolymer of ethylene oxide or a copolymer of ethylene oxide with another alkylene oxide as, for example, propylene oxide, butene-1 oxide, cis- or trans-butene-2 oxide, etc., wherein the copolymer contains at least about 40% ethylene oxide. The molecular weight of the polymer that is used is not critical, the only criterion being that it becomes inolubilized on cross-linking. Generally the polymer will have a molecular weight of about 5,000 and preferably from about 100,000 to about 1,000,000. Higher molecular weight polymers can be used up to 10,000,000 or more, but may necessitate application to the polypropylene article from the melt rather than from a solution.

The amount of ethylene oxide polymer applied to the polypropylene surface to alter the properties thereof can be varied over a wide range and will, of course, depend upon the type of polypropylene article being coated. Thus in the case of fibers, yarns and fabrics made of polypropylene, the amount of coating applied to the surface is generally cited as an add-on weight and the range will be from about 0.01% to about 25% of the total weight of polypropylene, and preferably the add-on level will be for most applications from about 0.02% to about 10%. The amount used will, of course, depend on the desired property of the polypropylene article. Thus, in the case of antistatic properties, the amount used will depend considerably on the amount of surface per unit weight of the polypropylene article. In the case of films and molded articles, the amount used will obviously be dependent on the thickness of the coating desired rather than being cited on the basis of the weight of polypropylene. In any event, since we are dealing with a surface phenomenon, the amount of the ethylene oxide polymer coating is more specially cited in terms of thickness and will be anything from a monomolecular layer of the polymer up to 3 mils or more, but for most practical considerations will be a thickness of about 5 A. and more preferably from about 20 A. up to about 1 mil.

Any means can be used for applying the mixture of ethylene oxide polymer and azido cross-linking agent to the surface of the polypropylene. The fibers, films, fabrics, etc., of polypropylene can be dipped in a solution, dispersion or emulsion of these two agents in any convenient solvent and of a concentration suitable to give the desired amount of add-on. Such solutions, dispersions or emulsions can also be painted, sprayed, etc., onto the polypropylene surface, padded on, etc. In the case of films and fabrics, they can be applied by a roll, doctor blade, etc. Diluents suitable for applying the mixture of ethylene oxide polymer and azido cross-linking agent are water, any inert organic diluent as, for example, aromatic hydrocarbons such as benzene, toluene, etc., halogenated hydrocarbons such as carbon tetrachloride, ethylene dichloride, etc., acetone, dioxane, ethyl acetate, methyl isobutyl ketone, etc. Obviously, the diluent will be one which is not a solvent for the polypropylene so as not to destroy the surface of the polypropylene article.

Many variations can be made in the process of altering the surface characteristics of polypropylene in accordance with this invention. Thus various additives such as emulsifiers, wetting agents, antioxidants, etc., can be added to the solution applied, or inert fillers, dyes, etc., if such are desired in the adherent coating. Many other variations will be apparent to those skilled in the art.

The following examples will illustrate the process of this invention and the outstanding antistatic properties of the product of this invention. All parts and percentages are by weight unless otherwise indicated.

Examples 1–7

In Examples 2–7, a 6.8 oz./sq. yd. abrasive twill with a 2/1 weave and a 68 x 44 count made from spun polypropylene fibers was used and compared with a cotton broadcloth fabric (3.5 oz./sq. yd. and 136 x 68 count) used in Example 1 as a control. All fabrics were laundered to remove any factory finishing agents. In Examples 4, 6 and 7, the fabric was dipped in an ethylene dichloride solution and in Example 5 a water dispersion of poly(ethylene oxide) and 12.4% of an azido cross-linking agent based on the poly(ethylene oxide) and then was passed through wringer rolls after which the add-on weights of the coating were determined. The fabrics were then heated under nitrogen for 1 hour at 140° C., except in Example 6 where the fabric was heated for 1 hour at 140° C. between the platens of a press at 472 p.s.i.g. In Example 3 the fabric was treated in the same way except that the azido cross-linking agent was omitted. The poly(ethylene oxide) used in these examples was a commercial product having a melt viscosity of 23,000 to 26,000 poises at 150° C. and a 5% water solution viscosity at 25° C. of 1500 to 2500 centipoises, a molecular weight of approximately 600,000. In Example 7 there was additionally added to the coating solution 4% by weight of the poly(ethylene oxide) of a polymerized trimethyl dihydroquinoline as an antioxidant.

A static charge was built up on strips of each fabric by frictional contact across metal bars. When the static charge on the fabric reached 1,000 volts, the friction-producing source was stopped and the charge allowed to decay. The discharge time for the charge on each fabric relative to the discharge time for cotton fabric, which has excellent antistatic properties, was noted. In Examples 3 and 4 it was not possible to induce a charge greater than 100 volts until after the fabric had been washed. In Example 5, it took 31 seconds for the static charge to decay from 1,000 to 200 volts and there was excellent retention of this antistatic property after washing as seen from the data below. Tabulated below are the data for each example showing the time to decay (in minutes and seconds) from a static charge of 1,000 volts to 200 volts after one washing and for Examples 3 to 5 after six washings.

TABLE I

| Ex. No. | Solvent for Applying Poly(Ethylene Oxide) and Concentration | Cross-Linking Agent and Concentration, Percent by Wt. of Poly(Ethylene Oxide) | Amount of Poly(Ethylene Oxide) Applied to Fabric (Percent by Wt.) | Antistatic Performance After One Washing | | | Antistatic Performance After Six Washings | | |
|---|---|---|---|---|---|---|---|---|---|
| | | | | Initial Voltage | Final Voltage | Time | Initial Voltage | Final Voltage | Time |
| | Not treated | | | 1,000 | 200 | 1′03″ | | | |
| | Not treated | | | 1,000 | 990 | 10′ | | | |
| | 5% in $C_2H_4Cl_2$ | None | 7.8 | 1,000 | 945 | 25′ | 1,000 | 910 | 25′ |
| | 5% in $C_2H_4Cl_2$ | 12.4% CMBAF [1] | 10.2 | 1,000 | 200 | 49″ | 1,000 | 200 | 1′29″ |
| | 5% in water | 12.4% CMBAF | 7.2 | 1,000 | 200 | 1′10″ | 1,000 | 200 | 50″ |
| | 5% in $C_2H_4Cl_2$ | 12.4% TEGBAF [2] | 8.5 | 1,000 | 200 | 1′ 9″ | | | |
| | 5% in $C_2H_4Cl_2$ | 12.4% TEGBAF | 8.6 | 1,000 | 200 | 32″ | | | |

[1] 1,4-cyclohexanedimethyl-bis(azidoformate).
[2] 2,2′-ethylenedioxydiethyl-bis(azidoformate).

Example 8

The fabric prepared in Example 5, having a decay time of 31 seconds to drop 1,000 to 200 volts, was dry-cleaned using two cleaning sequences, each of which involved one wash with a hydrocarbon solvent and one wash with a chlorinated hydrocarbon solvent (AATCC Test Method 86—1957T). The decay time after this dry-cleaning had increased to only 35 seconds.

In contrast, the fabric prepared in Example 3 where no cross-linking agent was used, and on which a 1,000 volt charge could not be induced before washing or dry-cleaning, had a decay time of over 5 minutes to drop from 1,000 volts to 200 volts after only one dry-cleaning sequence.

Example 9

A sample of the polypropylene fabric, described in the foregoing examples, was treated as described in Examples 4–7, except that the coating solution used was a 10% solution of the poly(ethylene oxide) in benzene and contained 10% by weight of the poly(ethylene oxide) of tetramethylene bis(azidoformate). The add-on was 0.2% of poly(ethylene oxide) by weight of the fabric. It was cured by heating under nitrogen for 1 hour at 140° C. This fabric was tested for its antistatic properties by building up a static charge by rubbing it across the knee ten times and then checking the cigarette ash pick-up. It gave no cigarette ash pick-up even at 1 inch from ashes. It was also washed once and was free of static charge as measured by same test. In the same test, untreated fabric picked up some ashes at 3 inches and a large amount of ashes at 1 inch.

Example 10

A sheet of compression molded stereoregular polypropylene (a commercial polypropylene having a reduced specific viscosity of 3.3 as measured on a 0.1% solution of the polymer in decahydronaphthalene at a temperature of 135° C.) was dip coated with a 1% solution of poly(ethylene oxide) in ethylene dichloride and containing 0.1% of 4,4'-diphenylmethane diazide, i.e., 10% by weight of the poly(ethylene oxide), and then was air dried. The poly(ethylene oxide) used was a commercial, water-soluble homopolymer having a molecular weight of about 600,000. A portion of the coated film was irradiated by exposure to a high pressure mercury arc (UV range of 1849 to 4,000 A.) at a distance of 13 inches for 10 minutes. The cross-linked poly(ethylene oxide) coating was not removed when the surface of the film was scrubbed with warm water whereas when a portion of the coated film that had not been irradiated was scrubbed with warm water, the poly(ethylene oxide) coating was completely removed.

Example 11

The process described in Example 4 was repeated except that instead of poly(ethylene oxide) there was used a copolymer of ethylene oxide containing 75% by weight of ethylene oxide and 25% by weight of propylene oxide, which copolymer had a molecular weight of about 125,000. The coated polypropylene fabric so obtained took 1 minute to drop from a static charge of 1,000 volts to 200 volts. After six washings the decay time to drop from 1,000 volts to 200 volts was 1 minute and 40 seconds.

As will be seen from the foregoing examples, the process of this invention has resulted in the production of a polypropylene surface with permanently altered properties. The new polypropylene having a cross-linked coating of an ethylene oxide polymer is, as may be seen, resistant to electrostatic charges and retains this resistance even after washing, dry-cleaning, etc. In addition to forming an antistatic finish on the polypropylene article, the printability of the polypropylene surface is greatly enhanced, as is also the dry receptivity. Many other uses for the coated polypropylene articles of this invention will be obvious to those skilled in the art, as for example use in the photographic and printing arts, etc.

What I claim and desire to protect by Letters Patent is:

1. As a new article of manufacture, stereoregular polypropylene substrate having a substantially permanent and antistatic coating of an ethylene oxide polymer selected from the group consisting of homopolymers of ethylene oxide and copolymers of ethylene oxide with another lower alkylene oxide wherein said copolymer contains at least about 40% by weight of ethylene oxide, insolubilized by cross-linking with an azido cross-linking agent.

2. The product of claim 1 wherein the ethylene oxide polymer is poly(ethylene oxide).

3. The product of claim 1 wherein the ethylene oxide polymer is a copolymer of ethylene oxide and propylene oxide.

4. The product of claim 1 wherein the polypropylene substrate is polypropylene fiber.

5. The product of claim 1 wherein the polypropylene substrate is polypropylene film.

6. The product of claim 1 wherein the polypropylene substrate is polypropylene fabric.

References Cited by the Examiner

UNITED STATES PATENTS

| | | | |
|---|---|---|---|
| 2,525,691 | 10/1950 | Lee et al. | 117—138.8 X |
| 2,986,507 | 5/1961 | Steck | 117—93.31 |
| 3,101,989 | 8/1963 | Toureille | 8—55 |
| 3,140,197 | 7/1964 | Heberlein et al. | 117—93.31 |
| 3,211,752 | 10/1965 | Breslow | 260—349 |

WILLIAM D. MARTIN, *Primary Examiner.*

R. HUSACK, *Assistant Examiner.*

UNITED STATES PATENT OFFICE
CERTIFICATE OF CORRECTION

May 16, 1967

Patent No. 3,320,088

George B. Feild

It is hereby certified that error appears in the above numbered patent requiring correction and that the said Letters Patent should read as corrected below.

Column 1, line 50, for "not" read -- most --; line 61, for "for" read -- are --.

Signed and sealed this 14th day of November 1967.

(SEAL)
Attest:

Edward M. Fletcher, Jr.
Attesting Officer

EDWARD J. BRENNER
Commissioner of Patents